United States Patent
Nogami et al.

(10) Patent No.: US 8,185,064 B2
(45) Date of Patent: May 22, 2012

(54) ADAPTIVE MODULATION CONTROL SYSTEM AND WIRELESS COMMUNICATION APPARATUS

(75) Inventors: Toshizo Nogami, Chiba (JP); Takashi Onodera, Yotsukaido (JP); Hidekazu Tsuboi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1059 days.

(21) Appl. No.: 11/908,597

(22) PCT Filed: Feb. 14, 2006

(86) PCT No.: PCT/JP2006/302497
§ 371 (c)(1),
(2), (4) Date: Nov. 16, 2007

(87) PCT Pub. No.: WO2006/098105
PCT Pub. Date: Sep. 21, 2006

(65) Prior Publication Data
US 2008/0188184 A1 Aug. 7, 2008

(30) Foreign Application Priority Data
Mar. 17, 2005 (JP) .................................. 2005-078206

(51) Int. Cl.
*H04B 1/02* (2006.01)
*H04B 1/66* (2006.01)
(52) U.S. Cl. ............... 455/102; 455/23; 455/42; 455/65; 455/506; 375/219; 375/260; 375/261; 375/262; 370/212; 370/213; 370/214; 370/215
(58) Field of Classification Search .................. 455/23, 455/42, 65, 61, 102, 506, 295; 375/219, 375/260–262, 295, 298, 299, 347, 340, 349, 375/278, 284; 370/338, 212–215, 483
See application file for complete search history.

(56) References Cited

U.S. PATENT DOCUMENTS
2002/0110138 A1* 8/2002 Schramm ...................... 370/430
2006/0209937 A1* 9/2006 Tanaka et al. .................. 375/219

FOREIGN PATENT DOCUMENTS
JP 2005-57710 A 3/2005
(Continued)

OTHER PUBLICATIONS

Yoshiki et al., "Performance of the OFDM based Adaptive Modulation System with a Multilevel Transmit Power Control Scheme using Delay Profile Extrapolation Technique for High Mobility Terminals," Technical Report of IEICE, CS2002-58, 2002, pp. 41-46.

(Continued)

*Primary Examiner* — Tuan Pham
(74) *Attorney, Agent, or Firm* — Birch, Stewart, Kolasch & Birch, LLP

(57) ABSTRACT

Object
To reduce deterioration of transmission quality under circumstances where the moving speed is high.
Overcoming Means
An adaptive modulation control apparatus for adaptively selecting a modulation parameter from among a plurality of modulation parameters determined based on a plurality of modulation schemes, coding rates of error correction or a combination thereof corresponding to a propagation path state is provided with a reception state measuring section (2) that measures a reception state of a signal received from a communicating apparatus, a correcting section (3) that makes a correction to change propagation path information indicative of a measurement result of the propagation path state based on the measured reception state, and a modulation parameter selecting section (4) that selects a modulation parameter corresponding to the corrected propagation path information.

9 Claims, 14 Drawing Sheets

FOREIGN PATENT DOCUMENTS

| | | |
|---|---|---|
| JP | 2005-64947 A | 3/2005 |
| JP | 2005-65323 A | 3/2005 |
| JP | 2005-318533 A | 11/2005 |

OTHER PUBLICATIONS

Suzuki et al., "An estimation scheme of propagation path characteristics for an adaptive modulation system," Technical Report of the IEICE, RCS94-65, 1984, pp. 37-42.

Paranchych et al., "A Method for Outer Loop Rate Control in High Data Rate Wireless Networks," Proc. IEEE VTC2002, vol. 3, pp. 1701-1705.

Takeda et al., "Threshold Controlling Scheme for Adaptive Modulation and Coding System," IEICE Trans. Commun., vol. E89-B, No. 5, 2006, pp. 1598-1604.

* cited by examiner

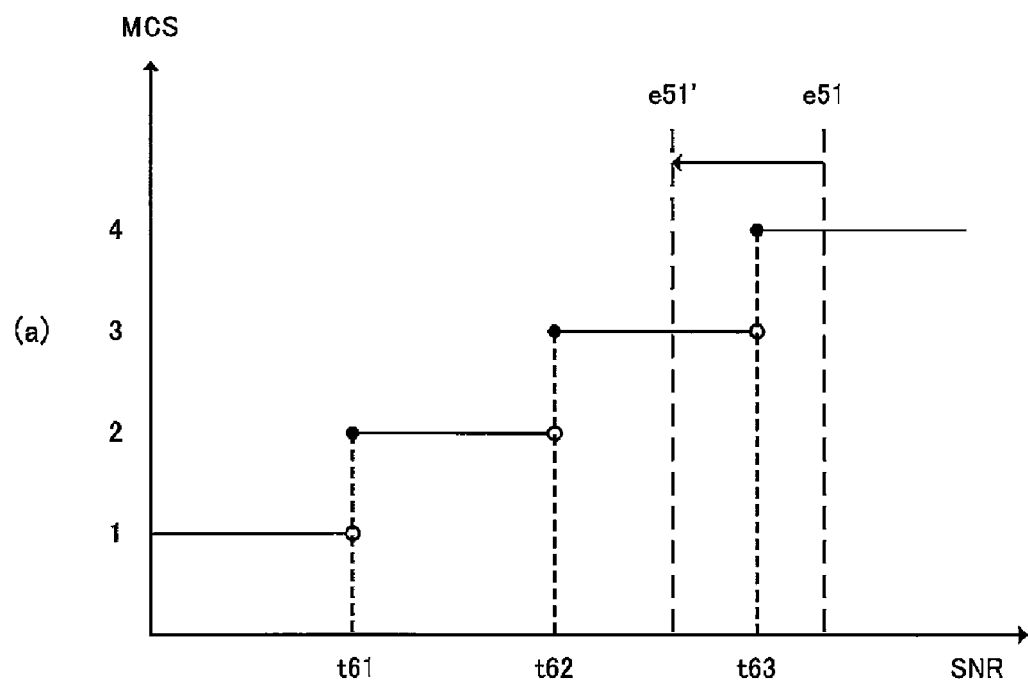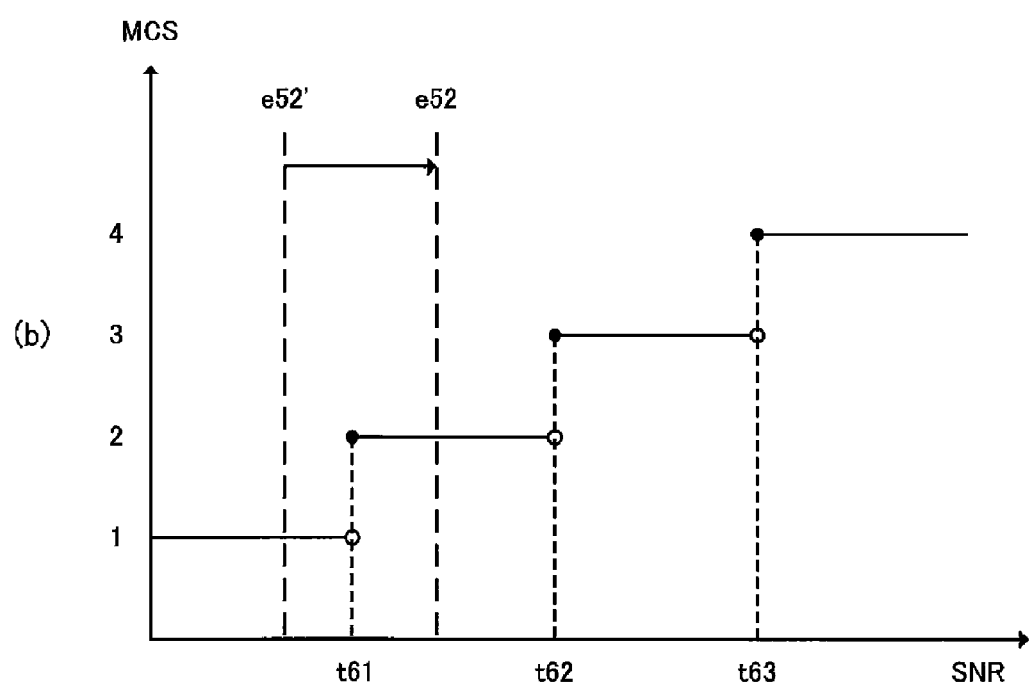
FIG.4

ADAPTIVE MODULATION CONTROL SYSTEM AND WIRELESS COMMUNICATION APPARATUS

TECHNICAL FIELD

The present invention relates to an adaptive modulation control system and wireless communication apparatus for adaptively selecting one modulation parameter from among a plurality of modulation parameters determined based on a plurality of modulation schemes, coding rates of error correction or a combination thereof, corresponding to an estimation result of a propagation path state.

BACKGROUND ART

In conventionally known adaptive modulation communication, estimation of the state of the propagation path is performed to be a criterion by which to adaptively select a modulation parameter (MCS: Modulation and Coding Scheme) comprised of a plurality of modulation schemes, coding rates of error correction or a combination thereof.

Generally, the state of the propagation path is estimated using a preamble that is a known signal inserted into a radio frame, as a value of Carrier to Noise power Ratio (CNR) from the reception state of the preamble (see Non-patent Document 1). Further, in subcarrier adaptive modulation communication in multicarrier transmission schemes, a propagation path state for each subcarrier is estimated, and a modulation parameter is selected for each subcarrier.

FIG. 13 is a block diagram showing an apparatus configuration example in a conventional OFDM (Orthogonal Frequency Division Multiplexing) subcarrier adaptive modulation system. In FIG. 13, a propagation path measuring circuit 71 estimates a propagation path state from information of a received signal, and outputs an estimation result to a modulation parameter selecting circuit 72. The modulation parameter selecting circuit 72 (uniquely) selects a modulation parameter from the input estimation result of the propagation path state, and outputs information of the selected modulation parameter to a subcarrier adaptive modulation coding circuit 73.

The subcarrier adaptive modulation coding circuit 73 performs adaptive modulation for each subcarrier corresponding to the selected modulation parameter. An IFFT circuit 74 performs inverse Fourier transform on an output of the subcarrier adaptive modulation coding circuit 73 to transform into a digital OFDM signal, and outputs the signal to a D/A conversion section 75. The D/A conversion section 75 converts the digital OFDM signal to an analog signal.

Meanwhile, when a moving speed of a terminal increases, since temporal variations in the propagation path cannot be neglected, as a propagation path estimation method tolerant of temporal variations in the propagation path, a method is proposed for performing propagation path estimation by extrapolating propagation path measurement results using a plurality of past pilot symbols (see Non-patent Document 2).

FIG. 14 is a diagram illustrating an outline of the propagation path estimation method as described in Non-patent Document 2. Referring to FIG. 14, the propagation path estimation method using linear extrapolation processing in the above-mentioned technique will briefly be described below. In FIG. 14, $h_{n-1}$ and $h_n$ are respectively assumed to be propagation path estimation results using a previous n−1th pilot symbol 81 and nth pilot symbol 82. The propagation path estimation value $\hat{h}$ in an estimation target symbol 83 is expressed as in Equation (1), using a time interval $T_f$ 87 between the n−1th pilot symbol 81 and nth pilot symbol 82, and a time interval $T_i$ 88 between the nth pilot symbol 82 and the estimation target symbol 83.

[Eq. 1]

$$\hat{h} = \frac{T_f + T_i}{T_f} h_n - \frac{T_i}{T_f} h_{n-1} \quad (1)$$

The aforementioned method is linear extrapolation using a linear equation, and further, a method is known of using extrapolation processing using a polynomial of a plurality of past propagation path estimation results.

Non-patent Document 1: Suzuki et al. "An Estimation Scheme of Propagation Path Characteristics for an Adaptive Modulation System" IEICE Technical Report, RCS94-65, p. 37-42, 1994

Non-patent Document 2: Yoshiki et al. "Performance of the OFDM based Adaptive Modulation System with a Multi-level Transmit Power Control Scheme using Delay Profile Extrapolation Technique for High Mobility Terminals", IEICE Technical Report, RCS2002-58, p. 41-46, 2002

DISCLOSURE OF INVENTION

Problems to be Solved by the Invention

However, an actual propagation path state changes for a period during which MCS is selected based on the propagation path estimation result and transmission is performed. Therefore, in the same way as in the case of selecting an unsuitable modulation parameter due to propagation path estimation error, unsuitable MCS is selected as the result, and there are problems of the occurrence of deterioration of communication performance such as degradation of error rate characteristics, decreases in throughput and the like. Further, under circumstances where the moving speed is extremely high, using only the conventional extrapolation scheme cannot follow temporal variations in the propagation path, and there is a problem that propagation path estimation accuracy deteriorates inversely when the propagation path variation exceeds following performance.

The present invention is carried out in view of the circumstances, and it is an object of the invention to provide an adaptive modulation control system and wireless communication apparatus enabling deterioration of transmission quality to be reduced as compared with the conventional technique, even under circumstances where the moving speed is high.

Means for Solving the Problem (1) To achieve the above-mentioned object, the present invention takes measures as described below. In other words, an adaptive modulation control system according to the invention is characterized by having a reception state measuring section that measures a reception state of a signal received from a communicating apparatus, a correcting section that makes a correction to change propagation path information indicative of a measurement result of the propagation path state based on the measured reception state, and a modulation parameter selecting section that selects a modulation parameter corresponding to the corrected propagation path information.

Thus, since the reception state is measured, it is possible to stochastically grasp how the propagation path state changes after a lapse of predetermined time. Then, the propagation path information is corrected to be changed based on the measured reception state, a modulation parameter is selected corresponding to the corrected propagation path information, and it is thereby possible to use a modulation parameter corresponding to the probability of the temporal variation in the propagation path state. By this means, even when the temporal variation is intense in the propagation path state, it is possible to reduce deterioration of communication performance by making a correction.

(2) Further, an adaptive modulation control system according to the invention is characterized by having a reception state measuring section that measures a reception state of a signal received from a communicating apparatus, a storage section that stores propagation path information indicative of a measurement result of a propagation path state, a transmission-time propagation path estimating section that estimates a transmission-time propagation path state that is a propagation path state of the transmission time based on current propagation path information and one or a plurality of pieces of previous propagation path information stored in the storage section, a correcting section that makes a correction to change the transmission-time propagation path state based on the measured reception state, and a modulation parameter selecting section that selects a modulation parameter corresponding to the corrected transmission-time propagation path state.

Thus, since the reception state is measured, it is possible to stochastically grasp how the propagation path state changes after a lapse of predetermined time. Then, the transmission-time propagation path state that is a propagation path state of the transmission time is estimated based on current propagation path information and one or a plurality of pieces of previous propagation path information stored in the storage section, the estimated transmission-time propagation path state is corrected to be changed based on the measured reception state, a modulation parameter is selected corresponding to the corrected propagation path information, and it is thereby possible to use a modulation parameter corresponding to the probability of the temporal variation in the propagation path state. By this means, even when the temporal variation is intense in the propagation path state, it is possible to reduce deterioration of communication performance by making a correction.

(3) Further, an adaptive modulation control system according to the invention is characterized by having a reception state measuring section that measures a reception state of a signal received from a communicating apparatus, a correcting section that makes a correction to change a relational expression of the propagation path state and the modulation parameter or a table comprised of propagation path states and modulation parameters based on the measured reception state, and a modulation parameter selecting section that selects a modulation parameter corresponding to propagation path information indicative of a measurement result of the propagation path state based on the corrected relational expression or table.

Thus, since the reception state is measured, it is possible to stochastically grasp how the propagation path state changes after a lapse of predetermined time. Then, the relational expression of the propagation path state and the modulation parameter or the table comprised of propagation path states and modulation parameters is corrected to be changed based on the measured reception state, a modulation parameter corresponding to the propagation path information indicative of a measurement result of the propagation path state is selected based on the corrected relational expression or table, and it is thereby possible to use a modulation parameter corresponding to the probability of the temporal variation in the propagation path state. By this means, even when the temporal variation is intense in the propagation path state, it is possible to reduce deterioration of communication performance by making a correction.

(4) Further, an adaptive modulation control system according to the invention is characterized by having a reception state measuring section that measures a reception state of a signal received from a communicating apparatus, a storage section that stores propagation path information indicative of a measurement result of a propagation path state, a transmission-time propagation path estimating section that estimates a transmission-time propagation path state that is a propagation path state of the transmission time based on current propagation path information and one or a plurality of pieces of previous propagation path information stored in the storage section, a correcting section that makes a correction to change a relational expression of the propagation path state and the modulation parameter or a table comprised of propagation path states and modulation parameters based on the measured reception state, and a modulation parameter selecting section that selects a modulation parameter corresponding to transmission-time propagation path state based on the corrected relational expression or table.

Thus, since the reception state is measured, it is possible to stochastically grasp how the propagation path state changes after a lapse of predetermined time. Then, the transmission-time propagation path state that is a propagation path state of the transmission time is estimated based on current propagation path information and one or a plurality of pieces of previous propagation path information stored in the storage section, the relational expression of the propagation path state and the modulation parameter or the table comprised of propagation path states and modulation parameters is corrected to be changed based on the measured reception state, a modulation parameter corresponding to the transmission-time propagation path state is selected based on the corrected relational expression or table, and it is thereby possible to use a modulation parameter corresponding to the probability of the temporal variation in the propagation path state. By this means, even when the temporal variation is intense in the propagation path state, it is possible to reduce deterioration of communication performance by making a correction.

(5) Further, in the adaptive modulation control system according to the invention, the propagation path state is characterized by being determined by one of reception power, signal to noise power ratio, signal to interference and noise power ratio, carrier power, carrier to noise power ratio, and carrier to interference and noise power ratio.

Thus, by determining the propagation path state by the reception power or carrier power, it is possible to simplify the circuit configuration. Further, by determining the propagation path state by the signal to noise power ratio or carrier to noise power ratio, it is possible to select a modulation parameter in consideration of the effect of noise. Furthermore, by determining the propagation path state by the signal to interference and noise power ratio, or carrier to interference and noise power ratio, it is possible to select a modulation parameter in consideration of the effects of the interfering signal and noise.

(6) Further, in the adaptive modulation control system according to the invention, the reception state is characterized by being determined by one of reception power, signal to noise power ratio, signal to interference and noise power ratio, carrier power, carrier to noise power ratio, and carrier to interference and noise power ratio.

Thus, by determining the reception state by the reception power or carrier power, it is possible to simplify the circuit configuration. Further, by determining the reception state by the signal to noise power ratio or carrier to noise power ratio, it is possible to select a modulation parameter in consideration of the effect of noise. Furthermore, by determining the reception state by the signal to interference and noise power ratio, or carrier to interference and noise power ratio, it is possible to select a modulation parameter in consideration of the effects of the interfering signal and noise.

(7) Further, in the adaptive modulation control system according to the invention, the reception state is characterized by being determined by one of a ratio or difference between reception power and a criterion value, a ratio or difference between a signal to noise power ratio and a criterion value, a ratio or difference value between a signal to interference and noise power ratio and a criterion value, a ratio or difference between carrier power and a criterion value, a ratio or difference between a carrier to noise power ratio and a criterion value and a ratio or difference between a carrier to interference and noise power ratio and a criterion value.

Thus, by determining the reception state by the ratio or difference between the reception power and the criterion value or the ratio or difference between the carrier power and the criterion value, it is possible to simplify the circuit configuration. Further, by determining the reception state by the ratio or difference between the signal to noise power ratio and the criterion value or the ratio or difference between the carrier to noise power ratio and the criterion value, it is possible to select a modulation parameter in consideration of the effect of noise. Furthermore, by determining the reception state by the ratio or difference between the signal to interference and noise power ratio and the criterion value, or the difference or ratio between the carrier to interference and noise power ratio and the criterion value, it is possible to select a modulation parameter in consideration of the effects of the interfering signal and noise. Still furthermore, since the reception state is determined by the ratio or difference to/from the criterion value, it is possible to change the criterion value corresponding to the reception quality and propagation path state. By this means, it is made possible to select a modulation parameter with a low error rate corresponding to the reception quality and propagation path state, and to select a modulation parameter with a high transmission rate.

(8) Further, in the adaptive modulation control system according to the invention, the criterion value is characterized by being one of a mean value, median value and minimum value of the reception power, signal to noise power ratio, signal to interference and noise power ratio, carrier power, carrier to noise power ratio, or carrier to interference and noise power ratio in a plurality of points in the time axis direction, when respective one of the reception power, signal to noise power ratio, signal to interference and noise power ratio, carrier power, carrier to noise power ratio, and carrier to interference and noise power ratio is expressed by a function of time.

Thus, by using the mean value of the reception states in a plurality of points in the time axis direction as a criterion value, it is possible to determine an expectation value at high accuracy. Further, by using the median value of the reception states in a plurality of points in the time axis direction as a criterion value, since the addition processing is reduced, it is possible to make the calculation amount smaller than in the case of using the mean value as a criterion value. Furthermore, by using the minimum value of the reception states in a plurality of points in the time axis direction as a criterion value, since a correction is made to make the propagation path state poor, it is possible to select a modulation parameter with a low error rate, and to improve the transmission quality. Still furthermore, when a large number of points are taken in the time axis direction, since the number of samplings increases in obtaining the criterion value, a difference between the criterion value and expectation value is decreased. Meanwhile, when a small number of points are taken in the time axis direction, the effect of shadowing is reduced. By this means, for example, corrections can be made effectively under circumstances where the product fdT of the Doppler frequency and adaptive modulation period is small. In addition, in calculating the criterion value, for example, in the case of the ratio or difference between the reception power and the criterion value, the criterion value is a mean value, median value or minimum value when a plurality of reception power values is a population. Further, for example, in the case of the ratio or difference between the signal to noise power ratio (SNR) and the criterion value, the criterion value is a mean value, median value or minimum value when a plurality of SNR values is a population. Furthermore, for example, in the case of the ratio or difference between the signal to interference and noise power ratio (SINR) and the criterion value, the criterion value is a mean value, median value or minimum value when a plurality of SINR values is a population.

(9) Further, the adaptive modulation control system according to the invention is characterized by using one of a mean value, median value and minimum value in the frequency axis direction as the criterion value when respective one of the reception power, signal to noise power ratio, signal to interference and noise power ratio, carrier power, carrier to noise power ratio, and carrier to interference and noise power ratio is expressed by a function of frequency, and being applied to multicarrier wireless communication.

Thus, by representing the reception state as the function of frequency, it is possible to perform statistical processing only by control information in one transmission unit, and it is thereby possible to make a correction without storing previous reception states. Further, when the reception state is expressed by the function of frequency, by using the mean value of the reception states in a plurality of points in the time axis direction as a criterion value, it is possible to determine an expectation value at high accuracy. Furthermore, by using the median value of the reception states in a plurality of points in the time axis direction as a criterion value, since the addition processing is reduced, it is possible to make the calculation amount smaller than in the case of using the mean value as a criterion value. Still furthermore, by using the minimum value of the reception states in a plurality of points in the time axis direction as a criterion value, since a correction is made to make the propagation path state poor, it is possible to select a modulation parameter with a low error rate, and to improve the transmission quality.

(10) Further, the adaptive modulation control system according to the invention is characterized by using one of a mean value, median and minimum value in the time axis direction and the frequency axis direction as the criterion value when one of the reception power, signal to noise power ratio, signal to interference and noise power ratio, carrier power, carrier to noise power ratio, and carrier to interference and noise power ratio is expressed by a function of time and frequency, and being applied to multicarrier wireless communication.

Thus, by representing the reception state as the function of the time axis and frequency, it is possible to make the number of samplings higher than in the statistical processing at single time, and it is thereby possible to calculate an expectation value with higher accuracy than in the case of only notification of the control information in one transmission unit. Further, when the reception state is expressed by the function of frequency, by using the mean value of the reception states in a plurality of points in the time axis direction as a criterion value, it is possible to determine an expectation value at high accuracy. Furthermore, by using the median value of the reception states in a plurality of points in the time axis direction as a criterion value, since the addition processing is reduced, it is possible to make the calculation amount smaller than in the case of using the mean value as a criterion value. Still furthermore, by using the minimum value of the reception states in a plurality of points in the time axis direction as a criterion value, since a correction is made to make the propagation path state poor, it is possible to select a modulation parameter with a low error rate, and to improve the transmission quality.

(11) Further, in the adaptive modulation control system according to the invention, the correcting section is characterized by determining reception quality of the received signal, and according to a determination result, changing the criterion value.

Thus, since the criterion value is changed corresponding to the reception quality, when the reception quality is poor, by increasing the criterion value, the correction can be made so as to select a modulation parameter to be selected when the propagation path state is poor. By this means, the modulation parameter with a low error rate is selected, and it is possible to improve the transmission quality. Further, when the reception quality is good, by decreasing the criterion value, the correction can be made so as to select a modulation parameter to be selected when the propagation path state is good. By this means, the modulation parameter with a high transmission rate is selected, and it is possible to improve the transmission efficiency.

(12) Further, in the adaptive modulation control system according to the invention, the correcting section is characterized by making a correction of at least one of changing to make the propagation path information poorer as the reception state measured in the reception state measuring section is higher, and of changing to make the propagation path information better as the reception state measured in the reception state measuring section is lower.

Thus, since the correction is made to change to make the transmission path information poorer as the measured reception state is higher, a modulation parameter with a low error rate is apt to be selected. As a result, it is possible to improve the transmission quality. Meanwhile, since the correction is made to change to make the transmission path information better as the measured reception state is lower, a modulation parameter with a high transmission rate is apt to be selected. As a result, it is possible to improve the transmission efficiency.

(13) Further, in the adaptive modulation control system according to the invention, the correcting section is characterized by making a correction of at least one of changing to make the transmission-time propagation path state poorer as the reception state measured in the reception state measuring section is higher, and of changing to make the transmission-time propagation path state better as the reception state measured in the reception state measuring section is lower.

Thus, since the correction is made to change to make the transmission-time propagation path state poorer as the measured reception state is higher, a modulation parameter with a low error rate is apt to be selected. As a result, it is possible to improve the transmission quality. Meanwhile, since the correction is made to change to make the transmission-time propagation path state better as the measured reception state is lower, a modulation parameter with a high transmission rate is apt to be selected. As a result, it is possible to improve the transmission efficiency.

(14) Further, in the adaptive modulation control system according to the invention, the correcting section is characterized by making a correction of at least one of changing the relational expression with the modulation parameter or the table comprised of propagation path states and modulation parameters so that a modulation parameter with a lower transmission rate is easier to select in the same propagation path conditions as the reception state measured in the reception state measuring section is higher, and of changing the table relational expression with the modulation parameter or the table comprised of propagation path states and modulation parameters so that a modulation parameter with a higher transmission rate is easier to select in the same propagation path conditions as the reception state measured in the reception state measuring section is lower.

Thus, since the correction is made to change so that a modulation parameter with a lower transmission rate is easier to select in the same propagation path conditions as the measured reception state is higher, a modulation parameter with a low error rate is apt to be selected. As a result, it is possible to improve the transmission quality. Meanwhile, since the correction is made to change so that a modulation parameter with a higher transmission rate is easier to select in the same propagation path conditions as the measured reception state is lower, a modulation parameter with a high transmission rate is apt to be selected. As a result, it is possible to improve the transmission efficiency.

(15) Further, a wireless communication apparatus according to the invention is a wireless communication apparatus applied to the adaptive modulation control system as described in any one of claims 1 to 4, and characterized by having functions of transmitting and receiving radio signals, and transmitting or receiving any one of propagation path information indicative of a measurement result of the propagation path state from a communicating apparatus, propagation path information indicative of an estimation result of the propagation path state in transmission in the communicating apparatus, propagation path information indicative of a measurement result of the propagation path state subsequent to the correction, propagation path information indicative of an estimation result of the propagation path state in transmission subsequent to the correction in the communicating apparatus, and modulation parameter information indicative of a selected modulation parameter.

According to this configuration, based on either of the aforementioned information received from the communicating apparatus, it is possible to select a suitable modulation parameter. As a result, it is possible to use a modulation parameter corresponding to the probability of the temporal variation in the propagation path state. By this means, even when the temporal variation is intense in the propagation path state, it is possible to reduce deterioration of communication performance by making a correction.

Advantageous Effect of the Invention

According to the invention, since the reception state is measured, it is possible to stochastically grasp how the propagation path state changes after a lapse of predetermined time. Then, the propagation path information is corrected to be changed based on the measured reception state, a modulation parameter is selected corresponding to the corrected propagation path information, and it is thereby possible to use a modulation parameter corresponding to the probability of the temporal variation in the propagation path state. By this means, even when the temporal variation is intense in the propagation path state, it is possible to reduce deterioration of communication performance by making a correction.

BEST MODE FOR CARRYING OUT THE INVENTION

The inventors of the invention found out that an expectation value of the temporal variation of the propagation path after a lapse of predetermined time varies with the reception state of the time of measuring the propagation path state, and actualized an adaptive modulation communication apparatus with improvements in estimation accuracy of the propagation path state. As an example, a case is described that the signal to noise power ratio (hereinafter, referred to as "SNR") and normalized reception power value are respectively used as the propagation path state and reception state. When average values of fading variations are almost constant, an expectation value of a relative level of reception power value S(k+Dk) after a lapse of predetermined time to reception power value S(k) at some time point is dependent on the value of S(k). In other words, an expectation value of displacement when a variation occurs in the propagation path state varies with the level of the reception power value at the time the propagation path state is estimated.

FIG. 1 is a graph showing results of the cumulative distribution of temporal variations with respect to the normalized reception power value in the average reception power obtained by computer simulations. In FIG. 1, the horizontal axis represents the temporal variation (ratio) of SNR, and the vertical axis represents the cumulative distribution. Solid line c91, dashed line c92, dotted line c93, alternate long and short dashed lines c94, or chain double-dashed line c95 shows the cumulative distribution of the temporal variation of SNR when the normalized reception power value is 0 dB, +3 dB, +1 dB, −1 dB, or −3 dB, respectively.

As shown in FIG. 1, it is understood that the cumulative distribution shifts to the left as the normalized reception power increases. This means that there is a correspondence between the normalized reception power value and the temporal variation of SNR, and in the correspondence, the distribution of the temporal variation shifts to smaller values as the normalized reception power value increases.

In consideration of the expectation value of variation displacement varying with the reception power value with attention directed toward the aforementioned correspondence, the adaptive modulation control system according to this embodiment performs propagation path estimation with higher accuracy than in the conventional system, and enables improvements in transmission quality and transmission rate in the adaptive modulation system.

First Embodiment

FIG. 2 is a block diagram illustrating a schematic configuration of an adaptive modulation control system according to the first embodiment. Described herein is a case of application to an OFDM subcarrier adaptive modulation system. In FIG. 2, a propagation path measuring section 1 measures the SNR in each subcarrier from information of a reception signal. A reception state measuring 2 obtains normalized reception power in each subcarrier. Based on the normalized reception power, a correcting section 3 corrects the SNR measured in the propagation path measuring section. A modulation parameter selecting section 4 selects the MCS from the SNR corrected in the correcting section 3 and a relational expression or table 5 for modulation parameter selection. A subcarrier adaptive modulation coding section 6 performs adaptive modulation for each subcarrier corresponding to the MCS selected as described above. An IFFT section 7 performs inverse Fourier transform on an output of the subcarrier adaptive modulation coding section 6 to transform into a digital OFDM signal. A D/A conversion section 8 converts the digital OFDM signal into an analog signal.

Herein, for the adaptive modulation control system according to the first embodiment, storage means for propagation path measurement results may be provided to use an average value of some previous results as a propagation path measurement result. It is thereby possible to average noise components.

Described next is a scheme of correction (method of determining a correction value) by the normalized reception power in the correcting section 3. FIG. 3 is a graph showing an example of measurement results of the normalized reception power. In FIG. 3, the normalized reception power in frequency f51 is assumed to be r51, and the normalized reception power in frequency f52 is assumed to be r52. In addition, in this example, a criterion value for normalization is average reception power p50. In other words, the normalized reception power represents a ratio between the reception power in each frequency and the average reception power.

Correction Example 1-1

As a first correction example, based on the measurement results of the normalized reception power as shown in FIG. 3, following correction is made on the SNRs in frequency f51 and frequency f52. In addition, both corrections of following (1) and (2) may be made.

(1) The correction is made to make the propagation path state poorer as the reception state increases.
(2) The correction is made to make the propagation path state better as the reception state decreases.

FIGS. 4(a) and 4(b) are graphs illustrating a manner where aforementioned correction (1) or (2) is made. FIGS. 4(a) and 4(b) show a case where, for example, based on the SNR, one modulation parameter (hereinafter, referred to as "MCS (Modulation and Coding Scheme)") is selected from among four kinds (1, 2, 3 and 4), and t61, t62 and t63 are given as thresholds in selecting the MCS. FIG. 4(a) shows the correction corresponding to f51 in FIG. 3, and FIG. 4(b) shows the correction corresponding to f52 in FIG. 3.

As a scheme of correction in the first correction example, for example, a following technique is considered. For example, assuming that the measured SNR value is e, the normalized reception power value is r, and that the corrected SNR value is e', the correction is made to meet equation (2), where w is a weight.

[Eq. 2]

$$e' = e \cdot (r)^{-w} \quad (2)$$

At this point, the measurement results of the normalized reception power in f51 and f52 as shown in FIG. 3 are respectively r51 and r52, where r51>1 and r52<1. Accordingly, the correction (e51'−e51) of SNR in FIG. 4(a) is opposite in direction to the correction (e52'−e52) of SNR in FIG. 4(b).

Correction Example 1-2

In the first correction example as described above, when the reception power value is extremely larger than the criterion value, r is extremely large and the correction term is large. In the case where the correction term is too large, when measurement values of the SNR and reception power include errors, there is a possibility that the estimation accuracy of the propagation path state subsequent to correction deteriorates greatly. To resolve the issue, a method is considered of providing an upper threshold in r. In other words, a correction is made to meet equation (3).

[Eq. 3]

$$\begin{cases} e' = e \cdot (r)^{-w} & r \le r_{th} \\ e' = e \cdot (r_{th})^{-w} & r > r_{th} \end{cases} \quad (3)$$

By this means, even when the reception power is extremely higher than the criterion value, it is also possible to reduce the effect of the error. Similarly, by providing a lower threshold, when the reception power value is extremely smaller than the criterion value, it is possible to suppress an excessive decrease in throughput.

Correction Example 1-3

In the aforementioned example, since the correction term is calculated for each normalized reception power value, the calculation amount increases. Therefore, the correction term f(r) for r is beforehand made into a table by experiments and/or simulations, and the correction may be made to meet equation (4).

[Eq. 4]

$$e' = e \cdot f(r) \quad (4)$$

FIG. 5 is a diagram showing a concept for selecting a modulation parameter in the first embodiment. The correction is made to change a propagation path state 101 measured for each subcarrier, and a modulation parameter is selected based on the corrected propagation path state 102 and a relational table 103 of the propagation path state and modulation parameter.

In addition, in the OFDM adaptive modulation system for grouping a plurality of subcarriers and applying adaptive modulation for each group, it is necessary to obtain the propagation path state for each group, and this embodiment can easily be applied to the OFDM adaptive modulation system for grouping a plurality of subcarriers. In other words, the propagation path state is corrected for each subcarrier using the correction method of this embodiment, the corrected propagation path states are grouped to obtain corrected propagation path states for each group, and adaptive modulation may be applied based on the corrected propagation path state for each group. Alternately, propagation path states for each subcarrier are grouped, corrected propagation path states for each group are obtained using the correction method of the invention in the propagation path states for each group, and adaptive modulation may be applied based on the corrected propagation path state for each group.

As described above, according to the adaptive modulation control system according to the first embodiment, by measuring the normalized reception power, it is possible to stochastically grasp how the SNR changes after a lapse of predetermined time. Then, the correction is made to change the SNR corresponding to the normalized reception power, a modulation parameter is selected corresponding to the corrected SNR, and it is thereby possible to use a modulation parameter adapted to the probability of the temporal variation in the propagation path. By this means, even when the temporal variation is intense in the propagation path, it is possible to reduce deterioration of communication performance by making a correction.

Further, in the measurement and correction of the propagation path state and reception state, and selection of a modulation parameter, a receiver may measure and correct the propagation path state and reception state, and transmit the results to a transmitter so that the transmitter performs modulation parameter selection, or a receiver may measure the propagation path state and reception state, and transmit the results to a transmitter so that the transmitter performs the correction and modulation parameter selection. Alternately, a receiver may perform measurement and correction of the propagation path state and reception state and selection of a modulation parameter, and transmit the results to a transmitter.

Second Embodiment

FIG. 6 is a block diagram illustrating a schematic configuration of an adaptive modulation control system according to the second embodiment. Described herein is a case of application to an OFDM subcarrier adaptive modulation system. In FIG. 6, a propagation path measuring section 10 measures the SNR from information of a reception signal. A storage section 11 stores the aforementioned measurement result of SNR corresponding to one or a plurality of times. A reception state measuring section 12 obtains normalized reception power in each subcarrier. Based on the measurement result of SNR and previous measurement results of SNR stored in the storage section 11, a transmission-time propagation path state estimating section 13 obtains a predication value of SNR in each subcarrier of the transmission time. Based on the normalized reception power, a correcting section 14 corrects the SNR prediction value estimated in the transmission-time propagation path state estimating section 13. A modulation parameter selecting section 15 selects the MCS from the SNR prediction value corrected in the correcting section 14 and a relational expression or table 16 for modulation parameter selection. A subcarrier adaptive modulation coding section 17 performs adaptive modulation for each subcarrier corresponding to the MCS selected as described above. An IFFT section 18 performs inverse Fourier transform on an output of the subcarrier adaptive modulation coding section 17 to transform into a digital OFDM signal. A D/A conversion section 19 converts the digital OFDM signal into an analog signal.

FIG. 7 is a diagram showing a concept for selecting a modulation parameter in the second embodiment. Previous SNR measurement results 121 and 122 are extrapolated in time, and a transmission-time propagation path state 123 is estimated. Then, according to the normalized reception power, the correction to change the predicted SNR is made, and based on the corrected transmission-time propagation path state 124 and a table 125 of the propagation path state and modulation parameter, a modulation parameter is selected. It is thereby possible to improve the accuracy of propagation path estimation.

As described above, according to the adaptive modulation control system according to the second embodiment, by measuring the normalized reception power, it is possible to stochastically grasp how the SNR changes after a lapse of predetermined time. Then, a value of the SNR at the transmission time is estimated by extrapolating in time a plurality of previous SNR measurement results, the correction is further made to change the SNR corresponding to the normalized reception power, a modulation parameter is selected corresponding to the corrected SNR, and it is thereby possible to use a modulation parameter adapted to the probability of the temporal variation in the propagation path. By this means, even when the temporal variation is intense in the propagation path, it is possible to reduce deterioration of communication performance by making a correction.

Third Embodiment

FIG. 8 is a block diagram illustrating a schematic configuration of an adaptive modulation control system according to the third embodiment. Described herein is a case of application to an OFDM subcarrier adaptive modulation system. In FIG. 8, a propagation path measuring section 20 measures the SNR from information of a reception signal. A reception state measuring section 21 obtains normalized reception power in each subcarrier. A Doppler frequency estimating section 22 estimates the Doppler frequency. Based on the normalized reception power and the Doppler frequency, a correcting section 23 corrects the SNR measured in the propagation path measuring section 20. A modulation parameter selecting section 24 selects the MCS from the SNR corrected in the correcting section 23 and a relational expression or table 25 for modulation parameter selection. A subcarrier adaptive modulation coding section 26 performs adaptive modulation for each subcarrier corresponding to the selected MCS. An IFFT section 27 performs inverse Fourier transform on an output of the subcarrier adaptive modulation coding section 26 to transform into a digital OFDM signal. A D/A conversion section 28 converts the digital OFDM signal into an analog signal.

The adaptive modulation control system according to the third embodiment has the Doppler frequency measuring section, takes the Doppler frequency into account in making the correction to change the SNR corresponding to the normalized reception power, and is thereby capable of improving the accuracy of propagation path estimation. As a scheme of the correction in consideration of the Doppler frequency, for example, a following technique is considered.

Correction Example 3-1

When the Doppler frequency is large, the temporal variation of the propagation path is intense. In other words, since the correlation decreases between the propagation path state at some time and the propagation path state after a lapse of predetermined time since some time, the probability distribution of the propagation path state subsequent to the variation approaches the Rayleigh distribution. The third embodiment is based on the prediction that the propagation path state is the Rayleigh distribution, and when the Doppler frequency is large, the correction term is increased. In other words, the weight w is made the function of the Doppler frequency fd, and w is determined so that w increases as the fd increases. By this means, since the correction width can be increased as the Doppler frequency increases, it is possible to improve the accuracy of propagation path estimation.

Correction Example 3-2

As another example of the scheme of the correction in consideration of the Doppler frequency, for example, a following technique is considered. In measuring the reception state, it is possible to reduce the effect of noise by performing sampling on the time axis in a plurality of times and obtaining the average value. However, when the Doppler frequency is large, the effect of shadowing is large, and a problem arises that an accurate median value cannot be calculated when an interval to calculate the average value is excessively large. Therefore, to reduce the effect of shadowing, the number (n) of samplings on the time axis in calculating the reception state is made the function of fd, and n is determined so that n decreases as fd increases. By this means, it is possible to decrease an average interval in calculating the criterion value as the Doppler frequency or adaptive modulation period increases.

In addition, samples in calculating the mean value, median value, and minimum value are made, for example, as described below. In other words, as shown in FIG. 9, a population of the reception power in obtaining the criterion value (mean value/median value/minimum value) is $N_c \times N_t$. To consider shadowing, the number of $N_t$ (i.e. interval in the time axis direction) is varied corresponding to the Doppler frequency. At this point, for the frequency direction, the reception power for all the subcarriers is always sampled. In other words, the number of samplings of the frequency direction is always $N_c$. At this point, the mean value is an average of $N_c \times N_t$ pieces of reception power, the median value is the $(N_c \times N_t \div 2)$th lowest (highest) reception power, and the minimum value is the smallest value among $N_c \times N_t$ pieces of reception power.

As described above, according to the adaptive modulation control system according to the third embodiment, by measuring the normalized reception power, it is possible to stochastically grasp how the SNR changes after a lapse of predetermined time. Then, the correction is made to change the SNR corresponding to the normalized reception power and Doppler frequency, a modulation parameter is selected corresponding to the corrected SNR, and it is thereby possible to use a modulation parameter adapted to the probability of the temporal variation in the propagation path. By this means, even when the temporal variation is intense in the propagation path, it is possible to reduce deterioration of communication performance by making a correction.

Fourth Embodiment

FIG. 10 is a block diagram illustrating a schematic configuration of an adaptive modulation control system according to the fourth embodiment. Described herein is a case of application to an OFDM subcarrier adaptive modulation system. In FIG. 10, a propagation path measuring section 30 measures the SNR in each subcarrier from information of a reception signal. A reception state measuring section 31 obtains a reception state. Based on the criterion value of the reception state, a correcting section 32 corrects a relational expression or table 33 of the propagation path state and modulation parameter. A modulation parameter selecting section 34 selects the MCS from the SNR measured in the propagation path measuring section 30 and the relational expression or table for modulation parameter selection corrected in the correcting section 32. A subcarrier adaptive modulation coding section 35 performs adaptive modulation for each subcarrier corresponding to the MCS selected as described above. An IFFT section 36 performs inverse Fourier transform on an output of the subcarrier adaptive modulation coding section 35 to transform into a digital OFDM signal. A D/A conversion section 37 converts the digital OFDM signal into an analog signal.

FIG. 11 is a diagram showing a concept of modulation parameter selection in the fourth embodiment. The correction is made to change a relational table 112 of the propagation path state and modulation parameter, and a modulation parameter is selected from the propagation path state 111 and the corrected relational table 113 of the propagation path state and modulation parameter. In the correction in the first embodiment as shown in FIG. 5, since the propagation path state is corrected for each subcarrier, the calculation amount increases as the number of subcarriers increases. Meanwhile, in the correction in the fourth embodiment, since the relational expression or table of the propagation path state and modulation parameter is only corrected, it is possible to obtain the same effect as in the first embodiment with a small amount of calculation.

As described above, according to the adaptive modulation control system according to the fourth embodiment, by measuring the normalized reception power, it is possible to stochastically grasp how the SNR changes after a lapse of predetermined time. Then, the correction is made to change the table indicating the relationship between the SNR and modulation parameter based on the criterion value of the reception state, a modulation parameter is selected corresponding to the SNR based on the corrected table, and it is thereby possible to use a modulation parameter adapted to the probability of the temporal variation in the propagation path. By this means, even when the temporal variation is intense in the propagation path, it is possible to reduce deterioration of communication performance by making a correction.

Fifth Embodiment

The fifth embodiment adopts a correction technique in a combination of the second embodiment and the fourth embodiment. FIG. 12 is a diagram showing a concept for selecting a modulation parameter in the fifth embodiment. Previous SNR measurement results 131 and 132 are extrapolated in time, and a transmission-time propagation path state 133 that is the propagation path state at the time of transmission is estimated. Meanwhile, the correction is made to change a relational table 134 of the propagation path state and modulation parameter. Then, a modulation parameter is selected from the transmission-time propagation path state 133 and a corrected relational table 135 of the propagation path state and modulation parameter.

In the correction in the first embodiment as shown in FIG. 5, since the propagation path state is corrected for each subcarrier, the calculation amount increases as the number of subcarriers increases. Meanwhile, in the correction in the fifth embodiment, since the relational expression or table of the propagation path state and modulation parameter is only corrected, it is possible to reduce the amount of calculation. Further, since the propagation path state at the transmission time is estimated by extrapolation in time, it is possible to improve the accuracy of propagation path estimation.

BRIEF DESCRIPTION OF DRAWINGS

FIG. 4(*a*) shows the correction corresponding to f51 in FIG. 3, FIG. 4(*b*) shows the correction corresponding to f52 in FIG. 3;

BRIEF DESCRIPTION OF SYMBOLS

Figure 1:
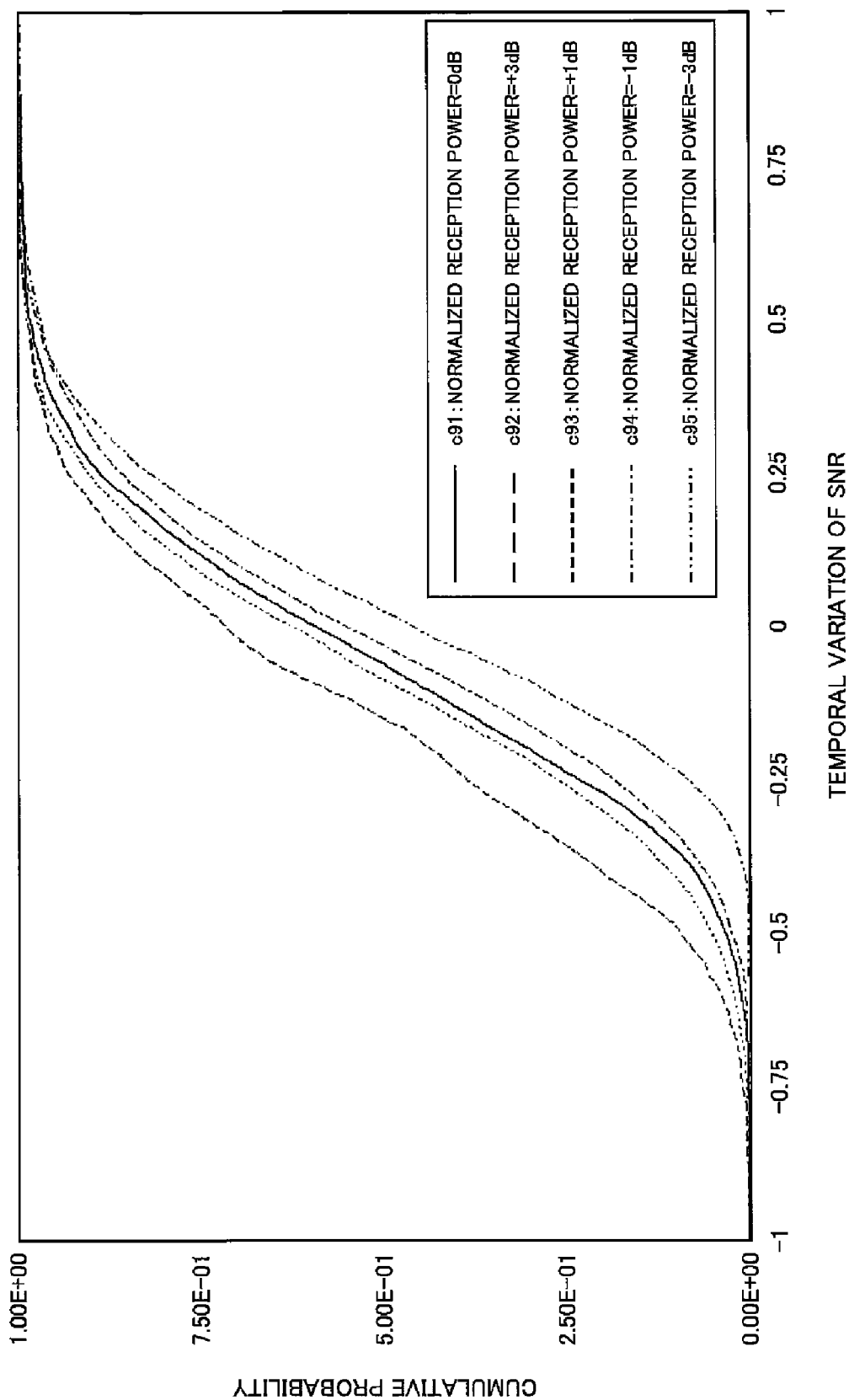
FIG. 1 is a graph showing results of the cumulative distribution of temporal variations with respect to the normalized reception power value in the average reception power obtained by computer simulations.
Figure 2:
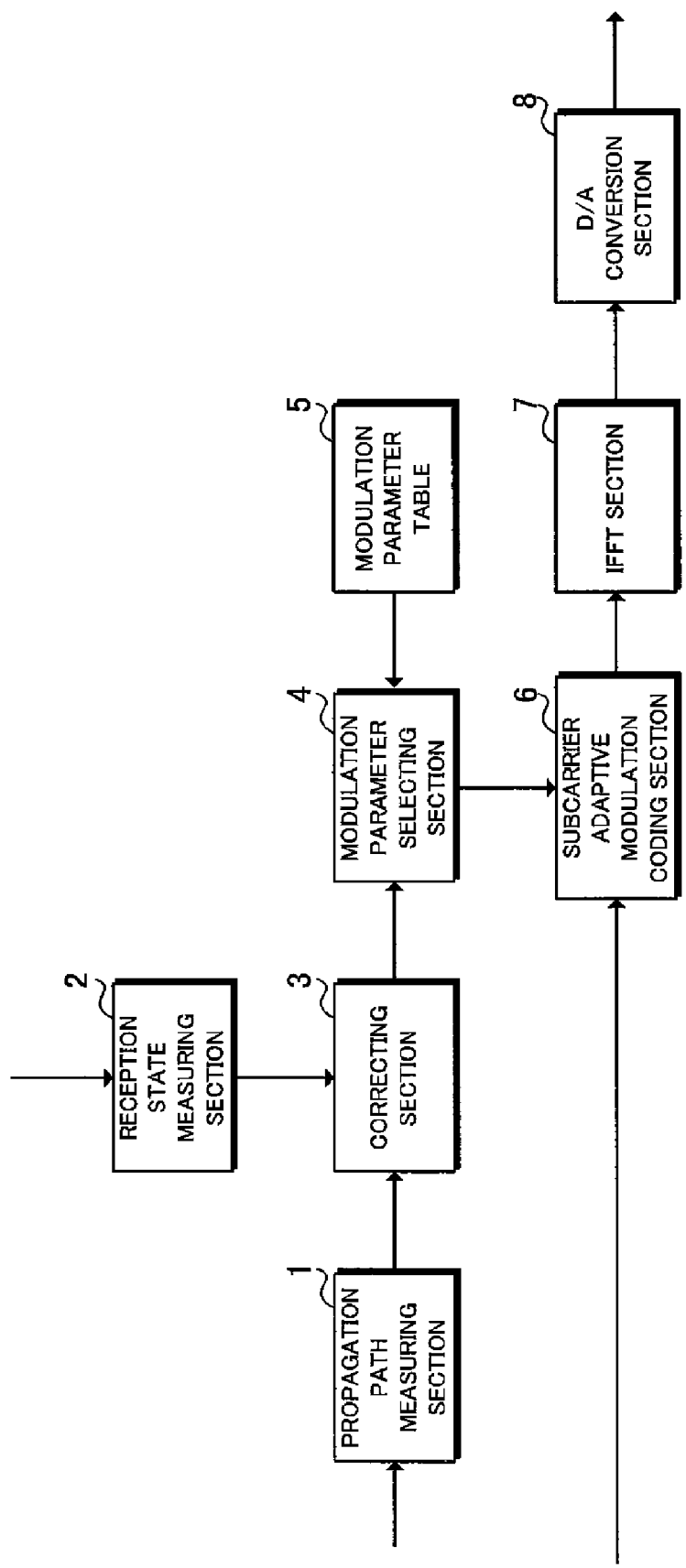
FIG. 2 is a block diagram illustrating a schematic configuration of an adaptive modulation control system according to the first embodiment.
Figure 3:
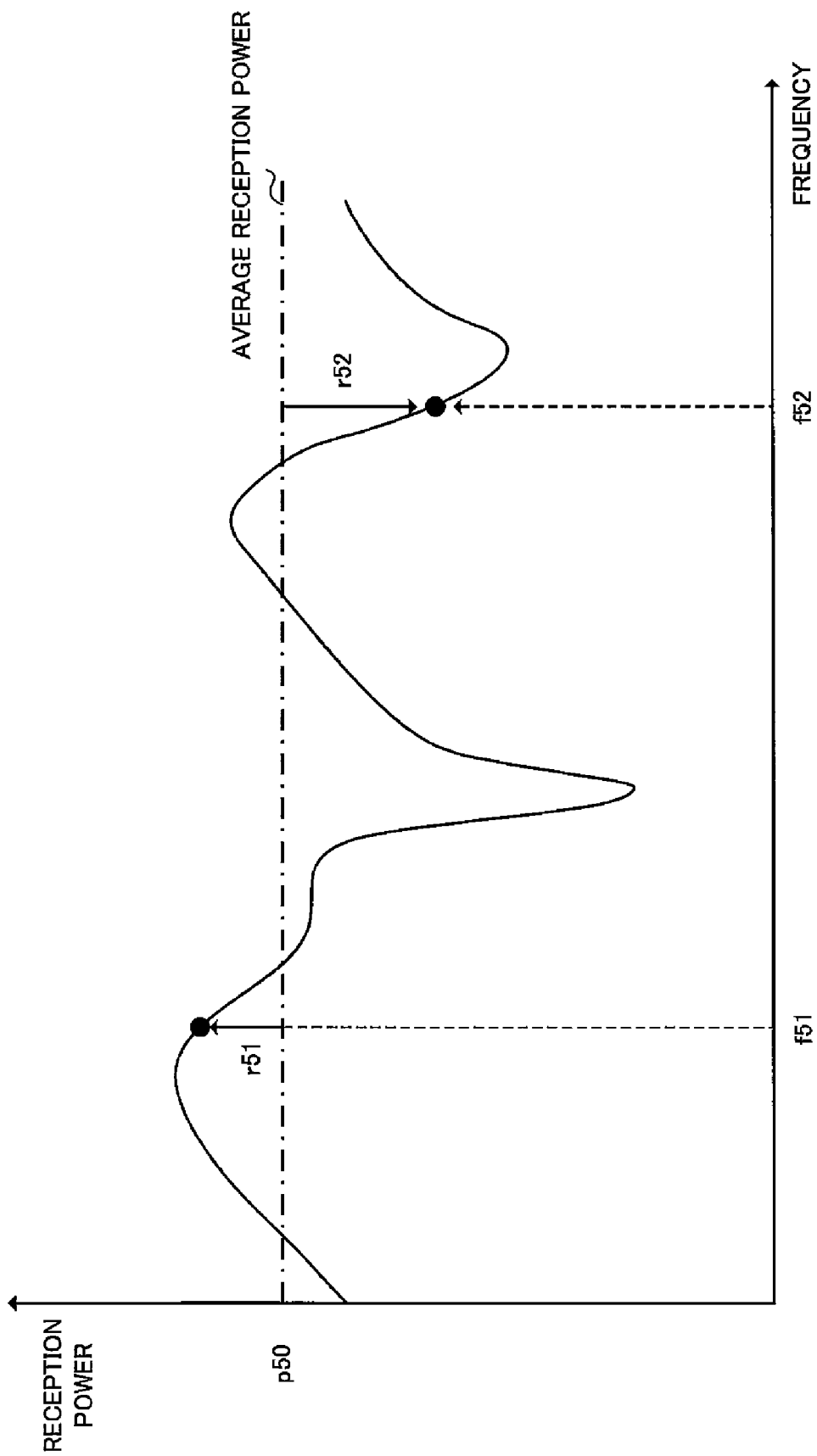
FIG. 3 is a graph showing an example of measurement results of the normalized reception power.
Figure 5:
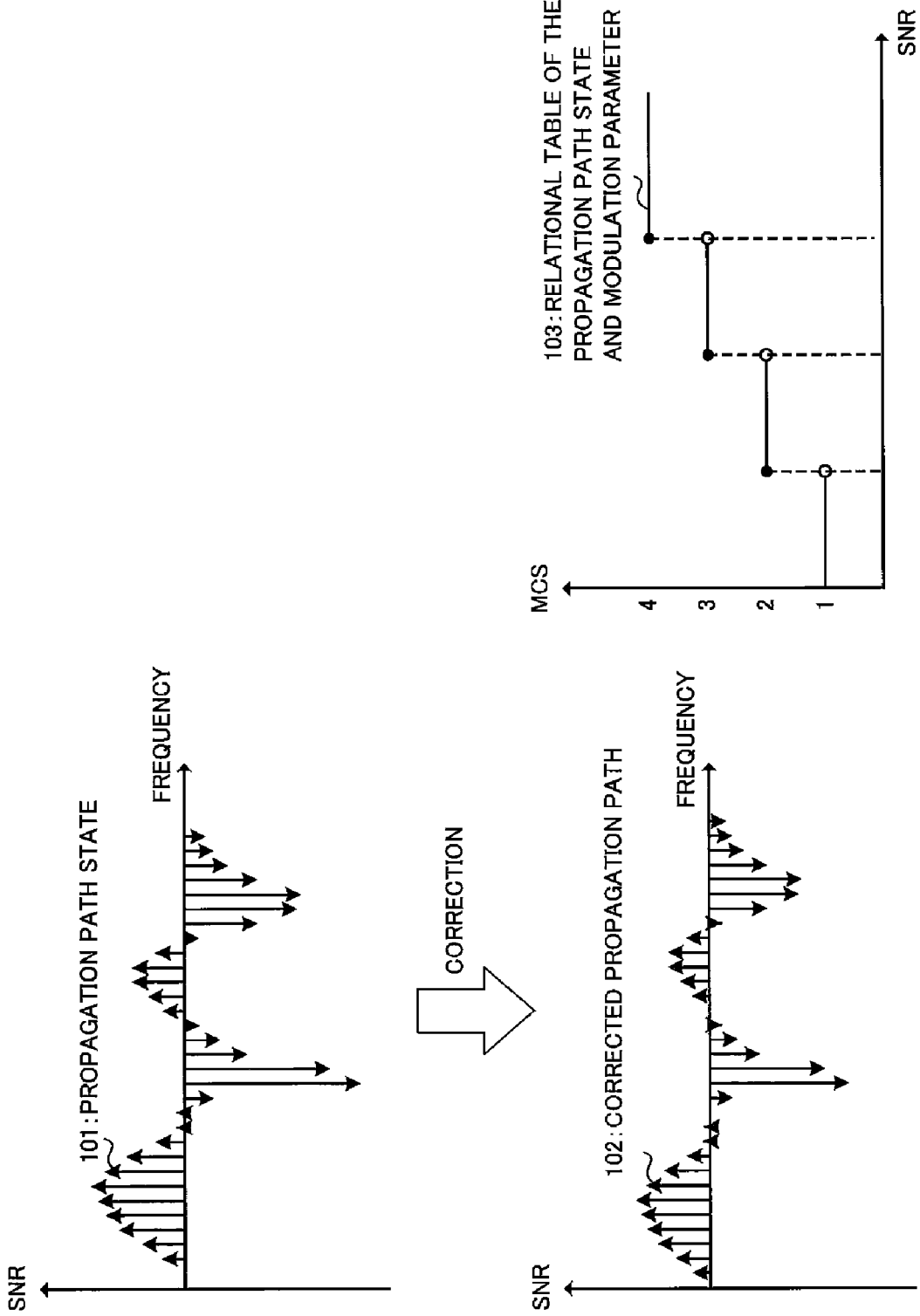
FIG. 5 is a diagram showing a concept for selecting a modulation parameter in the first embodiment.
Figure 6:
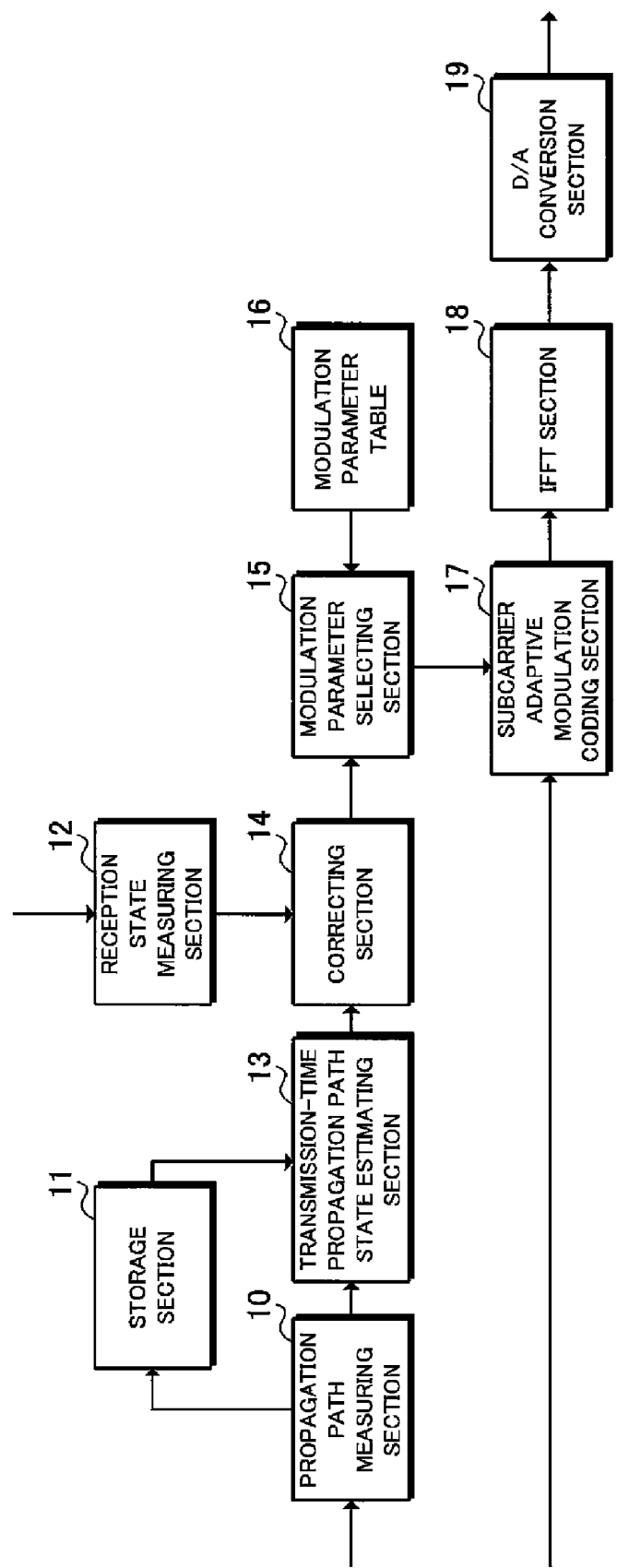
FIG. 6 is a block diagram illustrating a schematic configuration of an adaptive modulation control system according to the second embodiment.
Figure 7:
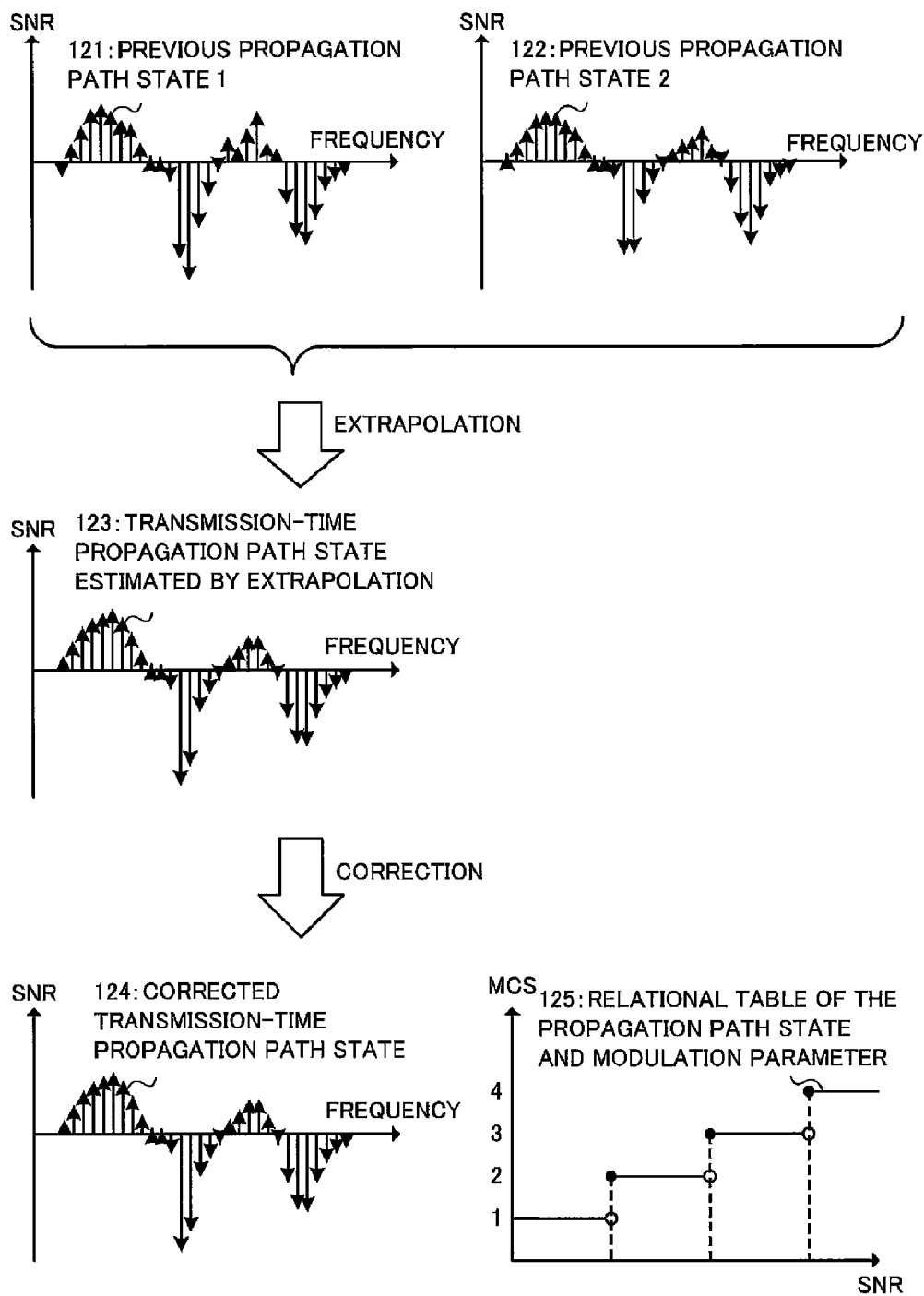
FIG. 7 is a diagram showing a concept for selecting a modulation parameter in the second embodiment.
Figure 8:
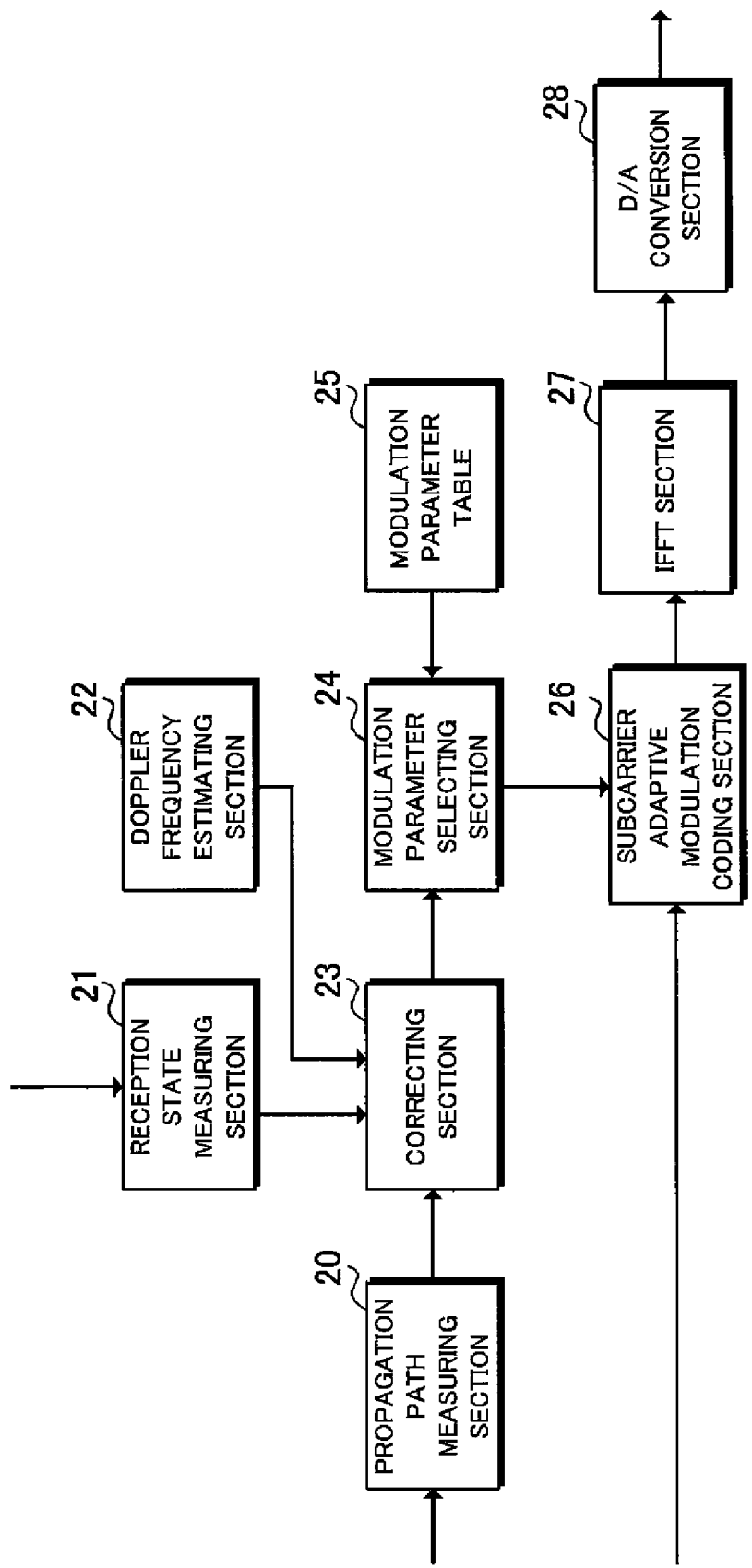
FIG. 8 is a block diagram illustrating a schematic configuration of an adaptive modulation control system according to the third embodiment.
Figure 9:
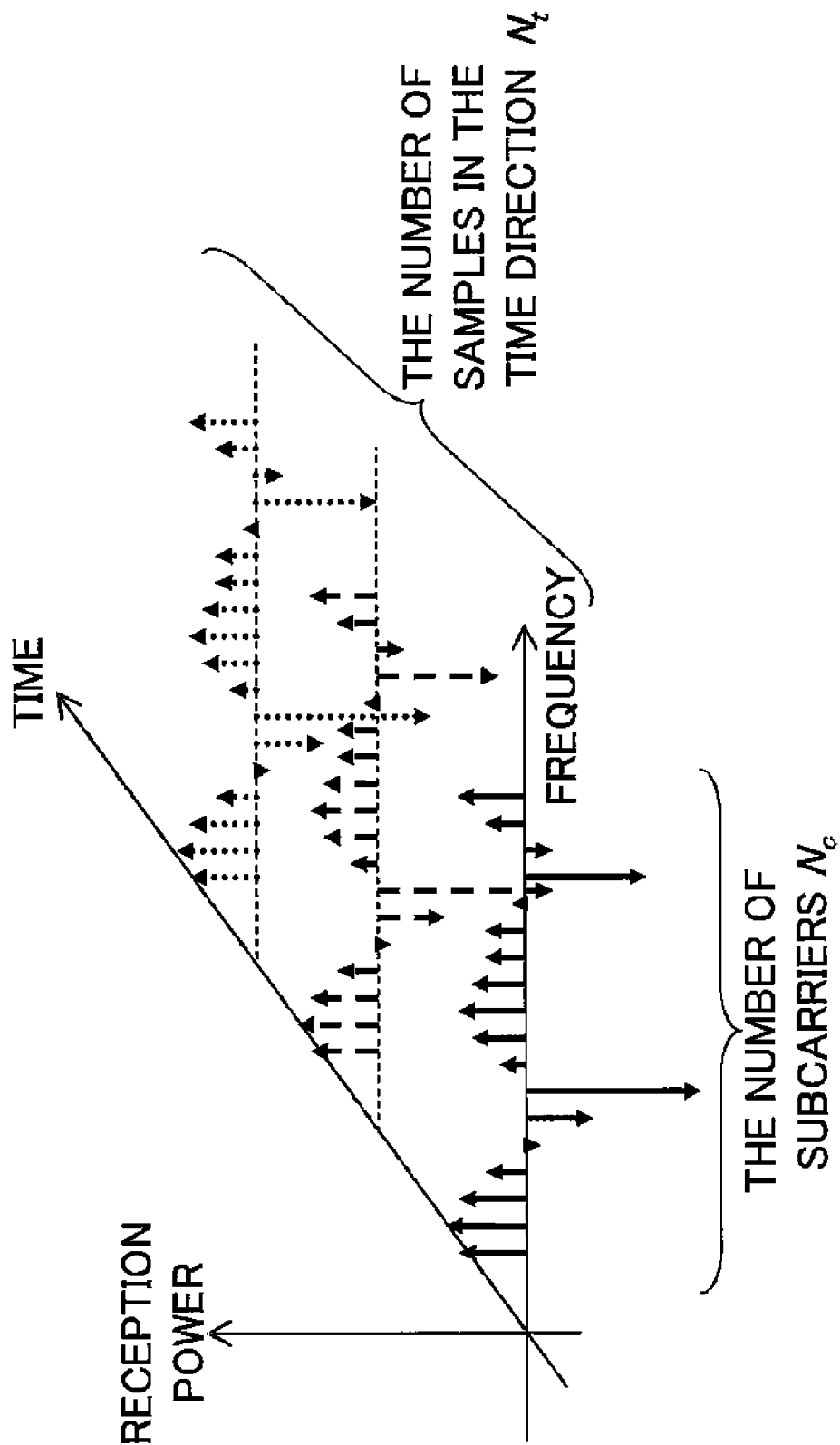
FIG. 9 is a diagram illustrating a manner of sampling in calculating a mean value, median value or minimum value in the adaptive modulation control system according to the third embodiment.
Figure 10:
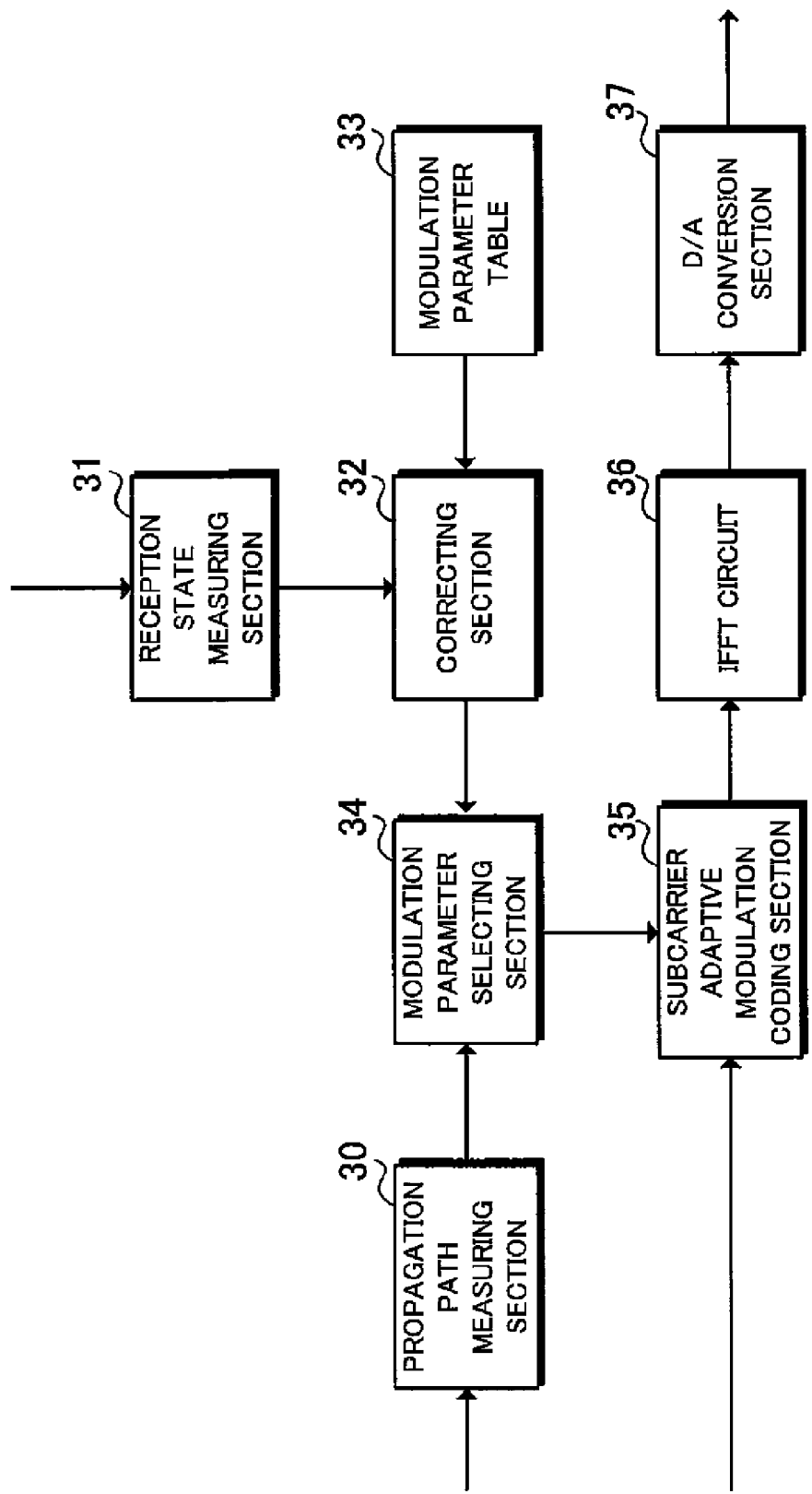
FIG. 10 is a block diagram illustrating a schematic configuration of an adaptive modulation control system according to the fourth embodiment.
Figure 11:
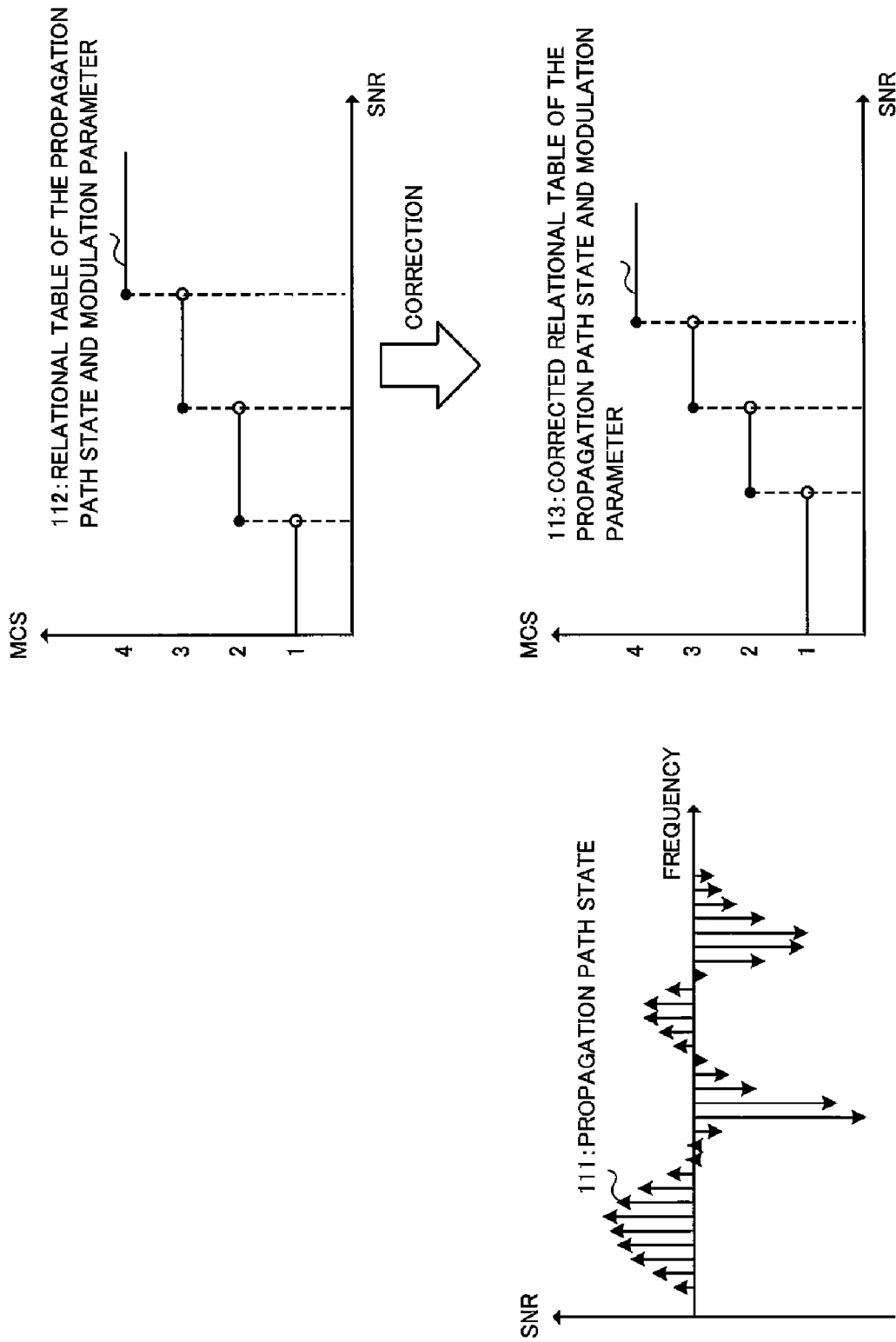
FIG. 11 is a diagram showing a concept of modulation parameter selection in the fourth embodiment.
Figure 12:
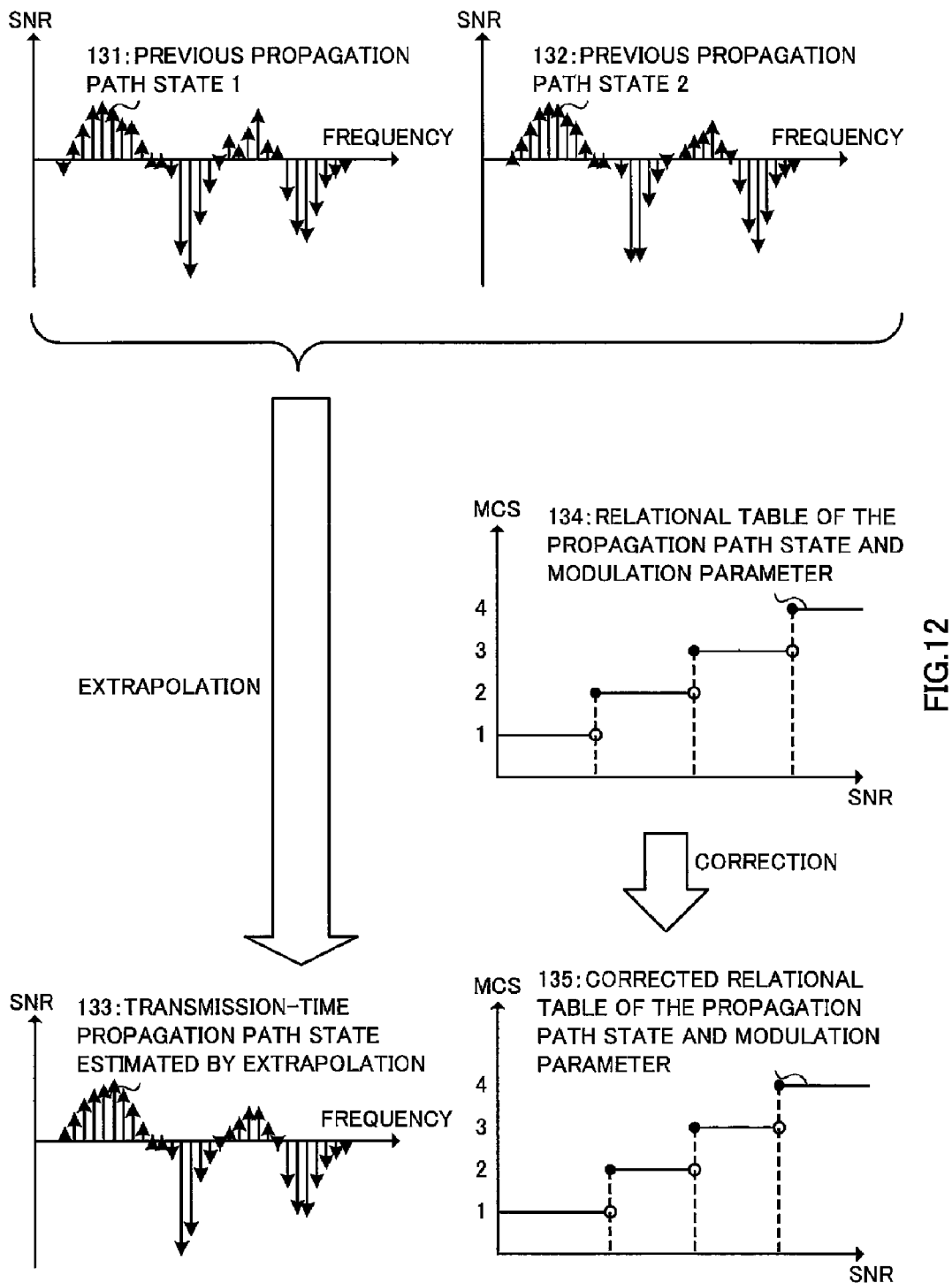
FIG. 12 is a diagram showing a concept for selecting a modulation parameter in the fifth embodiment.
Figure 13:
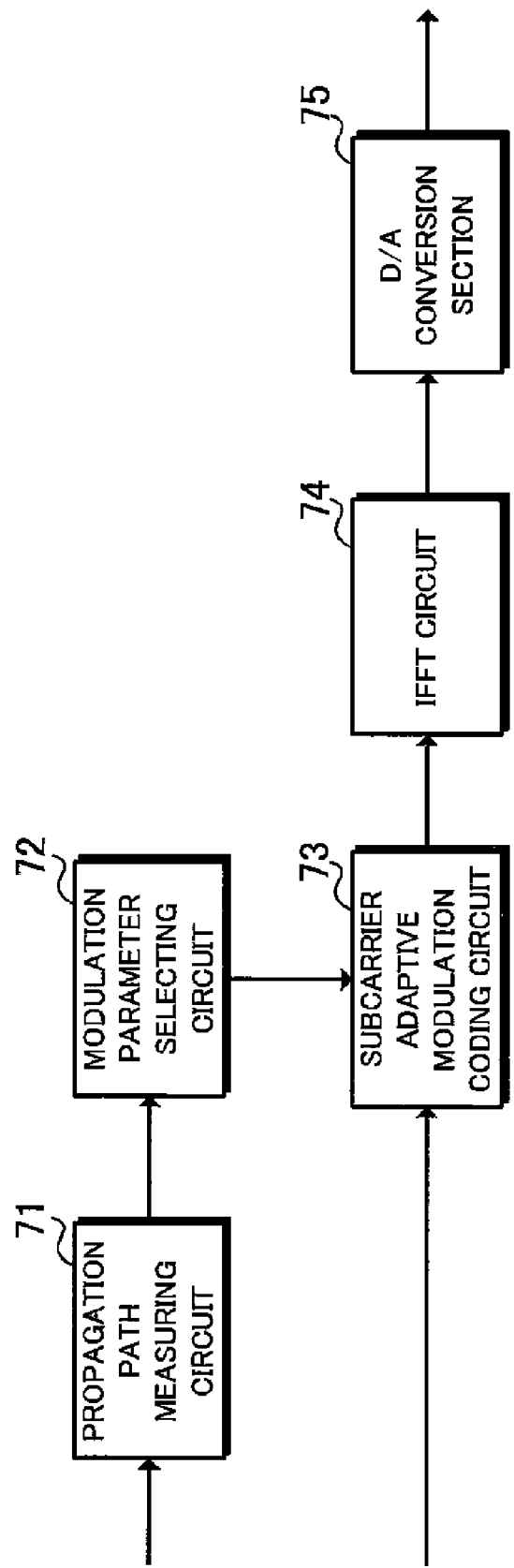
FIG. 13 is a block diagram showing an apparatus configuration example in a conventional OFDM subcarrier adaptive modulation system.
Figure 14:
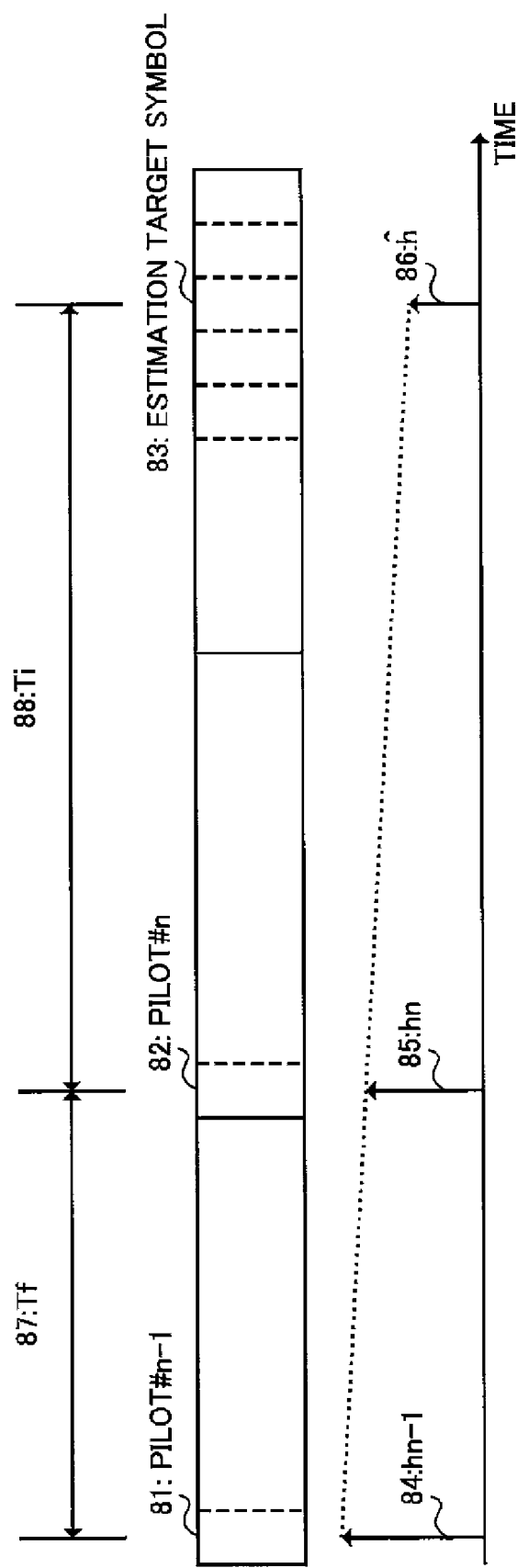
FIG. 14 is a diagram illustrating an outline of the propagation path estimation method as described in Non-patent Document 2.

1 Propagation path measuring section
2 Reception state measuring section
3 Correcting section
4 Modulation parameter selecting section
5 Modulation parameter table
6 Subcarrier adaptive modulation coding section
7 IFFT section
8 D/A conversion section
10 Propagation path measuring section
11 Storage section
12 Reception state measuring section
13 Transmission-time propagation path state estimating section
14 Correcting section
15 Modulation parameter selecting section
16 Modulation parameter table
17 Subcarrier adaptive modulation coding section
18 IFFT section
19 D/A conversion section
20 Propagation path measuring section
21 Reception state measuring section
22 Doppler frequency estimating section
23 Correcting section
24 Modulation parameter selecting section
25 Modulation parameter table
26 Subcarrier adaptive modulation coding section
27 IFFT section
28 D/A conversion section
30 Propagation path measuring section
31 Reception state measuring section
32 Correcting section
33 Modulation parameter table
34 Modulation parameter selecting section
35 Subcarrier adaptive modulation coding section
36 IFFT section
37 D/A conversion section
101, 102 Propagation path state
103 Relational table of the propagation path state and modulation parameter 111 Propagation path state
112 Relational table of the propagation path state and modulation parameter
113 Corrected relational table of the propagation path state and modulation parameter
121, 122 Previous propagation path state
123 Transmission-time propagation path state by extrapolation
124 Corrected transmission-time propagation path state
125 Relational table of the propagation path state and modulation parameter
131, 132 Previous propagation path state
133 Transmission-time propagation path state estimated by extrapolation
134 Relational table of the propagation path state and modulation parameter
135 Corrected relational table of the propagation path state and modulation parameter

The invention claimed is:

1. An adaptive modulation control system comprising:
a reception state measuring section that calculates a first reception state determined based on reception power of a signal received from a communicating party, or a second reception state indicated by a ratio or difference between the first reception state and a criterion value;
a correcting section that makes a correction of at least one of changing propagation path information indicative of a measurement result of a propagation path state to make the propagation path information poorer as the first or the second reception state is higher, and of changing the propagation path information to make the propagation path information better as the first or the second reception state is lower, based on the first or the second reception state; and
a modulation parameter selecting section that selects a modulation parameter corresponding to the corrected propagation path information.

2. The adaptive modulation control system according to claim 1, wherein the propagation path state is determined by one of reception power, a signal to noise power ratio, a signal to interference and noise power ratio, carrier power, a carrier to noise power ratio, and a carrier to interference and noise power ratio.

3. The adaptive modulation control system according to claim 1, wherein the reception state measuring section uses, as the first reception state, one of reception power, a signal to noise power ratio, a signal to interference and noise power ratio, carrier power, a carrier to noise power ratio, and a carrier to interference and noise power ratio.

4. The adaptive modulation control system according to claim 1, wherein the reception state measuring section calculates, as the second reception state, one of a ratio or difference between reception power and a criterion value, a ratio or difference between a signal to noise power ratio and a criterion value, a ratio or difference value between a signal to interference and noise power ratio and a criterion value, a ratio or difference between carrier power and a criterion value, a ratio or difference between a carrier to noise power ratio and a criterion value, and a ratio or difference between a carrier to interference and noise power ratio and a criterion value.

5. The adaptive modulation control system according to claim 1, wherein the criterion value is one of a mean value, median value and minimum value of the reception power, signal to noise power ratio, signal to interference and noise power ratio, carrier power, carrier to noise power ratio, or carrier to interference and noise power ratio in a plurality of points in the time axis direction, when respective one of the reception power, signal to noise power ratio, signal to interference and noise power ratio, carrier power, carrier to noise power ratio, and carrier to interference and noise power ratio is expressed by a function of time.

6. The adaptive modulation control system according to claim 1, wherein one of a mean value, median value and minimum value in the frequency axis direction is used as the criterion value when respective one of the reception power, signal to noise power ratio, signal to interference and noise power ratio, carrier power, carrier to noise power ratio, and carrier to interference and noise power ratio is expressed by a function of frequency, and the system is applied to multicarrier wireless communication.

7. The adaptive modulation control system according to claim 1, wherein one of a mean value, median value and minimum value in the time axis direction and the frequency axis direction is used as the criterion value when one of the reception power, signal to noise power ratio, signal to interference and noise power ratio, carrier power, carrier to noise power ratio, and carrier to interference and noise power ratio is expressed by a function of time and frequency, and the system is applied to multicarrier wireless communication.

8. The adaptive modulation control system according to claim 4, wherein the correcting section determines reception quality of the received signal, and according to a determination result, changes the criterion value.

9. A wireless communication apparatus applied to the adaptive modulation control system as described in claim 1, comprising:
functions of transmitting and receiving radio signals,
wherein the apparatus transmits or receives any one of propagation path information indicative of a measurement result of the propagation path state from a communicating party, propagation path information indicative of an estimation result of the propagation path state in transmission in the communicating party, propagation path information indicative of a measurement result of the propagation path state subsequent to the correction, propagation path information indicative of an estimation result of the propagation path state in transmission subsequent to the correction in the communicating party, and modulation parameter information indicative of a selected modulation parameter.

* * * * *